United States Patent [19]
Pelzer

[11] Patent Number: 6,019,923
[45] Date of Patent: Feb. 1, 2000

[54] PROCESS FOR MANUFACTURING DECORABLE MOULDED PARTS

[75] Inventor: Helmut Pelzer, Witten, Germany

[73] Assignee: HP-Chemie Pelzer Research & Development Ltd., Ireland

[21] Appl. No.: 09/004,279

[22] Filed: Jan. 8, 1998

Related U.S. Application Data

[63] Continuation of application No. 08/393,740, Feb. 24, 1995, abandoned.

[30] Foreign Application Priority Data

Aug. 25, 1992 [DD] German Dem. Rep. ............ 42 28 194

[51] Int. Cl.[7] .............................. B29C 45/14; B29C 45/16
[52] U.S. Cl. ......................... 264/132; 264/250; 264/266
[58] Field of Search .................................... 264/129, 132, 264/153, 163, 245–247, 259, 265, 266, 268, 271.1, 255, 250

[56] References Cited

U.S. PATENT DOCUMENTS

| | | | |
|---|---|---|---|
| 4,350,739 | 9/1982 | Mohiuddin . | |
| 4,510,115 | 4/1985 | Gokcen et al. | 264/515 |
| 4,622,191 | 11/1986 | Takeuchi | 264/266 |
| 5,318,739 | 6/1994 | Katagiri et al. | 264/266 |
| 5,322,832 | 6/1994 | Takeyama et al. | 503/227 |
| 5,330,269 | 7/1994 | Kamada et al. | 383/210 |
| 5,362,349 | 11/1994 | Zoller | 264/259 |
| 5,456,957 | 10/1995 | Jackson et al. | 428/31 |
| 5,494,630 | 2/1996 | Eraybar et al. | 264/138 |
| 5,616,396 | 4/1997 | Ueki et al. | 264/259 |
| 5,639,536 | 6/1997 | Yamazaki et al. | 428/141 |
| 5,679,301 | 10/1997 | Miklas et al. | 264/161 |
| 5,746,962 | 5/1998 | Yamamoto | 264/266 |
| 5,811,053 | 9/1998 | Ota et al. | 264/266 |

FOREIGN PATENT DOCUMENTS

| | | |
|---|---|---|
| 0 266 109 | 5/1988 | European Pat. Off. . |
| 0 412 346 | 2/1991 | European Pat. Off. . |
| 34 08 975 | 12/1986 | Germany . |
| WO 92/14226 | 11/1990 | WIPO . |
| WO 92/05030 | 4/1992 | WIPO . |

OTHER PUBLICATIONS

Japanese Patent Abstract, Pub. No. JP61057322, Mar. 24, 1986.
Derwent Patent Abstract, No. 93–085928, week 9310, Oct. 28, 1992, for S. African Patent No. 9200471.
Article, "Rompp Chemie Lexikon," by Prof. Dr. Jürgen Falbe and Prof. Dr. Manfred Regitz, pp. 4570–4571.
Ullmann's Encyclopedia of Industrial Chemistry, vol. B1, Corrosion, p. 8–66.
*Kunststoff Journal*, Spritzguss mit simultaner Dekoration, Jan.–Feb. 1992.

*Primary Examiner*—Angela Ortiz
*Attorney, Agent, or Firm*—Banner & Witcoff, Ltd.

[57] ABSTRACT

The subject matter of the present invention is a process for producing decorable moulded parts made of plastic materials, whereby an extrudable thermoplastic material is injected or pressed behind a non-dried or non-cured flat decorative layer or paint layer.

In a preferred embodiment, the decorative layer or paint layer is powder coated, whereby the support film, the paint layer and the thermoplastic material are coextruded together.

This process allows decorable moulded parts having complex geometrical shapes to be manufactured.

18 Claims, No Drawings

PROCESS FOR MANUFACTURING DECORABLE MOULDED PARTS

This application is a continuation application of U.S. patent application Ser. No. 08/393,740, filed Feb. 24, 1995 now abandoned.

Subject matter of the invention is a process for producing decorable moulded parts made of extrudable plastic material, particularly for the inside zone and outside zone of automobiles, for shop fittings and decoration for exhibitions.

Moulded parts, for instance mud guards or coverings of the most different kind of motor vehicles, in which the optical surface design is of importance are generally produced by injection moulding processes. The thus obtained moulded parts are subsequently provided with textiles, decoration coverings or colour coverings. Since the colour surface design or plastic materials in the automobile sector represents a certain difficulty, up to quite recently, moulded parts, for instance coverings for movable car roofs, side parts, doors or mud guards, frequently are also made of metal which are subsequently painted. The reason for this is, that the usual injection moulding process for producing moulded parts made of plastic which are subsequently subjected to a problematical paint coating are relatively expensive and costly. In this case, it is necessary that the paint is cured in a particularly good way and that it is participating in any deformation of the plastic and, consequently, has a certain flexibility which does not lead to detachments from the surface, even with distortion or deformation of the moulded part made of plastic. Furthermore, the so-called "overspray" is resulting in the usual painting processes which can be removed only by expensive procedures.

From Römpp Chemie Lexikon, 9th. edition, page 3681, 1982, for instance, powder paints and, particularly, powder coatings are known, whereby the coating of metal and plastic surfaces is performed by coating and subsequent sintering of thermosetting powders. These can be coated in the spinning or flocculation process by powder spraying processes like flame spraying, plastic-flame spaying or metal-spraying processes (electrostatic powder spaying). Thermoplasts are particularly suited for fluidized-bed coating.

From Ullmann's Encyclopedia of Industrial Chemistry, 5th. edition, volume B1, chapter 8–66 and volume A9, pages 558 and 559, powder coatings of articles are known.

Powder coatings were successful in the state of the art because hereby, to some extent, no overspray is resulting and also no emissions of solvents are to be suspected.

However, in the automobile sector, frequently problems are arising to distribute the paint in a uniform way. Since, particularly, the automobile sector claims high specifications of the optical quality of surface coatings, the paint coating of moulded parts made of plastic materials, particularly of injection moulded parts, is a special problem.

Another problem of the paint coating of injection moulded parts is the usually bad adherence between the paint coating and the substrate.

So-called "in-mould" or also "insert"-processes have been proposed in the state of the art, particularly for the production of consumer goods, in which a cured and dried paint (design, motive) is transferred from a sheet to an ABS-film. This composite is deep-drawn and punched. Due to the curing of the paint which is only bonded by surface adhesion to the ABS-film, only small deformations of the structural elements are possible. The preform produced in such a way, is positioned in an extrusion die for injecting behind the object and a thermoplastic is injected behind the preform. The sheet will remain a component of the moulded part. In the "in-mould"-process, especially modified hot-stamping sheets are conducted from the core through the extrusion die. In the injection moulding process, the paint layers are released from the support sheet by the influence of pressure and temperature and are firmly bond together by adhesion with the injected substrate.

Therefore, the object of the present invention is to provide a simplified process for producing decorable moulded parts made of extrudable plastic materials, particularly for automotive engineering.

A further object of the present invention is to provide a process for producing moulded parts, particularly for automotive engineering, by which the adherence between the paint coating and the extrudable support material made of plastic is improved in relation to the state of the art. Furthermore, it is necessary that the process meets also environmental aspects of today, whereby avoiding of the so-called overspray is of extreme importance. Also the optical quality of the surface coating is of the same great importance.

Further requirements of the decorablet moulded parts, particularly of those for automobile engineering, are, for instance, the possibility to realize a uniform paint over the whole area, as well as the possibility to mount permanent decorations, for instance, grains of wood, pictorial symbols or characters on a moulded part made of plastic. Furthermore, the obtained moulded parts should also be returned, if possible, to a recycling.

The above mentioned objects are resolved according to the invention by a process for producing decorable moulded parts, particularly for automotive engineering, made of plastic materials, whereby an extrudable thermoplastic material is injected or pressed behind a non-dried or non-cured flat decorative layer or paint layer.

Thereby, by means of the present invention a moulded plastic part is built-up from the outer paint coating to the moulded part.

Commercial powder paints are thermoplastic in a wide range of temperature and they cure by heating up above this temperature range. These paints are deformable to a large extent below the curing temperature. Preferably, the laminate of decorative layer or paint layer and thermoplastic material is brought before, or during, the injection or pressing to a temperature which is above the melting range of the higher melting system, a temperature at which very high transformation rates are attainable, and it is cooled after the formation of an intimate bonding. Thereby, at least at the boundary surface a melt is created consisting of both components, in such a way that a partial mixture of the decorative layer or the paint layer with the extruded plastic material will result in the form of a blend by coalescing. At the same time, the melt range of the decorative layer or paint layer is increased by curing and transition to the duroplastic range.

A furthermore preferred embodiment of the present invention comprises:

(a) providing a support film with a separable, flat decorative layer or with a uniform paint layer, (b) injecting or pressing an extrudable plastic material behind the thus obtained laminate without prior drying or curing of the decorative layer or paint layer, (c) releasing the thus obtained moulded part from the mould and subsequently, (d) separating the support film and the flat decorative layer or the uniform paint layer from one another by stripping.

Another advantage of the process according to the invention in relation to the "in-mould" and "insert" processes is the fact that the bonding between paint layer and the plastic material is realized by chemical way and not exclusively by surface adhesion. Although an additional use of adhesion agents in the neighborhood of the boundary layer is possible, this is normally not necessary since the non-cured decorative layer or paint layer is not only physically bonded to the plastic material by means of the present invention. What is more, a chemical bonding/blend is obtained between the decorative layer or paint layer and the plastic material.

It is possible, due to the strippable design of the bonding between support film and decorative layer, to provide decorative surface coatings directly on plastic materials which are in relation to their appearance at least equivalent to coatings which are coated to the preformed moulded part by the usually applied injection moulding process.

For instance, it is possible to attain a strippable bonding between the support film and the decorative layer or paint layer by coating a commercial automobile coating paint (acrylate paint) or a powder paint to a commercial polyester film. optionally, compounds can be admixed to the support film which are reducing the adherence of the paint to be coated, in order to improve the separation from the support film and decorative layer or paint layer. For instance, wax-like materials, silicones or the like can be added in this case to the support film. The coating of the strippable support film with the decorative layer or paint layer can, e.g., take place by coextrusion of the film and a powder paint. In the same way, it is possible according to the present invention to extrude simultaneously also the thermoplastic material such that, immediately, a triple layered composition is obtained.

The thickness of the support film is less critical, however, this support film should preferably have a thickness of from 30 to 200 µm, particularly 30 to 100 µm, in order to assure a stability in the compression mould. Particularly preferred, according to the present invention, is a support film made of polyester since this material can be extruded in a particularly simple way, and does not have any tendency to stick to the decorative layer or to the paint layer.

In the same way as in the case of the support film, the layer thickness of the decorative layer or paint layer is of less importance. It should be in the usual range of an automobile coating paint layer.

Therefore, in a preferred variant of the present invention, it is possible to coat a decorative layer or paint layer on the support film by spraying or dipping. In the same way, it is possible to apply the decorative layer or paint layer on the support film by knife coating or rolling.

In another preferred embodiment, the desired decoration is, e.g., applied to the support film by the roller printing process. In this case, it is referring to a flat, uniform paint coating of the later moulded part. In the same way it is possible, to apply figures, characters or also grains of wood by roller printing processes which are known per se. In this processes, particularly when using powder paints, no overspray is observed, such that the process is meeting the environmental requirements of today in a particular way. In an alternative coating process for the coating of a decoration or also of a flat, uniform layer by printing, it is possible to apply the same by a powder coating process, known per se, for instance by electrostatic deposition of the powder. In this case, the support film is preferably brought to a temperature which is sufficient to melt the applied decorative layer or paint layer but which is insufficient to cure or to dry it, and to utilize in this way the heat content of the film. Alternatively to this, it is also possible to produce a flat surface of high quality by using external heat treatment. However, in this case it should be considered that no curing or drying through of the decorative layer or paint layer is occurring.

Although a variety of processes are known in the state of the art for coating powder paints to any substrates, this additional variant of the process according to the invention for producing moulded parts being different from the usually used processes of paint coating by the fact that the powder paint is subjected to a thermal pretreatment during the extrusion, however, does not cure or dries through during the extrusion.

The temperature should be, e.g., in the range of from 100 to 130° C. during the extrusion, such that the powder paint can be cured at a temperature in the range of, e.g., from 160 to 210° C., during the injection or pressing or in a separate working procedure. In this case, a particularly good chemical bonding to the extrudable plastic material is achieved.

Preferably, the material of the powder coating is selected from duroplastic or thermoplastic materials which, however, should not be cured through or dried through before the lamination with the extrudable plastic.

The curing should be rather realized in a later state of the procedure, for instance after having subjected the laminate to a desired deformation. In the ideal case, the heat capacity of the hot extrudable plastic material is sufficient to cure or crosslink the powder paint.

As mentioned above, the powder paints to be used according to the invention, are known in the state of the art. In this way, the powder paints according to the present invention are particularly selected from polyolefins, polyimides, ethylene/vinyl acetate-copolymers, poly(vinyl chlorides), polyesters, polyepoxides and mixtures thereof.

Particularly preferred thermoplastic-duroplastic powder paints according to the present invention contain epoxide resins which are usually applied to surfaces by electrostatic spraying or by other processes. Particularly preferred according to the present invention are solid epoxide resins on the basis of bisphenol A (800 to 2000 EEM) which are cured through at high temperatures by solid crosslinking agents, e.g., dicyanodiamide, phenolic hardeners or dicarboxylic acid anhydrides. However, these duroplasts are still thermoplastic in the above mentioned lower temperature range of the coextrusion and only cure at high temperatures in the subsequent processing steps. From the chemical point of view, these components are per se known for the preparation of functional or decorable powder coatings. According to the present invention, it is further preferred to use imidazoles in the place of dicyanodiamides and, particularly maleic anhydrides instead of the crosslinking agents being solid at room temperature.

Particularly preferred according to the present invention, thermoplastic epoxide polyester hybrides or the so-called polyester-TGIC-resins are used within the whole temperature range, which are known from Ullmann's Encyclopedia. The use of thermoplastic and decorative layers or paint layers including the powder paint coatings, has the advantage that a compound system of thermoplastic materials is available when reusing or recycling the waste material.

For curing through or crosslinking the decorative layer or paint layer of the moulded part, it is necessary to heat the same after injection to high temperatures, for instance in the range of from 160 to 240° C., particularly 160 to 210° C., during 0,5 min to 120 min, particularly 1 min to 30 min. A too short time of curing as well as an insufficient heating of the powder paint results in an insufficient adherence of the powder paint on the thermoplastic material. Furthermore, the powder paint will not be sufficiently cured through, such that the permanent resistance towards external influences, e.g., weather factors, is not optimal. When exceeding the upper temperature limits, it is possible that already decomposition tendencies of the powder paint coating will occur. Possibly, the thermoplastic materials themselves are also not resistant to such high temperatures.

The requirements on the paint design are corresponding to the usual requirements on the respective moulded parts, such, e.g., to the requirements on the paint design in the automobile sector, on shop fittings and decoration for exhibitions.

The selection of the thermoplastic materials for the preparation of the moulded parts is less critical. However, it is a prerequisite that the plastics are extrudable and that they melt within a temperature range which is compatible with the melting range of the decorative layer or paint layer, particularly of the powder paint. A high melting range of the thermoplastic materials needs high temperatures of the moulded parts, such that the temperature which is necessary to cure the paint is possibly only attained by cooling the paint coating. However, thermally instable thermoplastic materials can normally not be extruded in a good way, particularly not at elevated temperatures. Therefore, the thermoplastic materials which are used in the present invention for preparing moulded parts are selected from extrudable polyolefins, particularly polyethylene, polypropylene, polyvinyl compounds, particularly poly(vinyl chloride), polyamides, polyacetals, polycarbonates, polyesters, polyepoxides, polyurethanes, ionomers and mixtures thereof, particularly ABS/PC-polymerisates.

The type of extrudable plastic is related to the desired application of the moulded part. When, for instance, a high shatter resistance is demanded in the automobile sector, it is preferred according to the present invention to use acrylonitrile-butadiene-styrene-polymerisates (ABS), polycarbonate (PC), polyolefins and, particularly polypropylene and ABS/PC-mixtures which, optionally contain filler materials as talcum. In the case, that no high requirements are raised to the shatter resistance, also thermoplastic polyesters or polystyrene can be used, e.g. for the preparation of coverings for motor units.

The scratch resistance, resistance to light (uv-Florida test) and the weathering resistance of the paint are particularly important in the automobile sector. Since, by means of the present invention, it is possible to use paints, which are per se known in the automobile sector, by way of roller printing processes, the desired requirements are fulfilled when using these paints.

In order to further improve the adherence between the printing colour (decoration) or the paint layer and the extrudable plastic material, it is possible without any difficulty to coat the laminate consisting of support film and decorative layer or paint layer before applying the injection-behind-process with a per se known adhesive, optionally by means of another roll. In the same way, it is possible according to the invention to incorporate circular stops, reinforcing fabrics, reinforcing non-wovens or the like for producing so-called sandwich structures between the decorative layer or the paint layer and the plastic material. In this case, the materials to be used are known to the one skilled in the art from the common plastic technology. Due to the relative low viscosity of the coextrudates, a permeation of the reinforcing materials as well into the powder paint coating as into the thermoplastic material is to be expected. Thereby, a particularly tight bonding between the paint coating and the thermoplastic material can be achieved.

Now, if by use of the injection-behind-technique a residual volume in the compression mould is filled with a thermoplastic material, an extremely good bonding between the decorative layer or paint layer and the plastic is formed, since also in this case both boundary surfaces are practically reacting with one another from the melt.

Though it is already possible to attain an extremely good strength of the thermoplastic material by means of the present invention, it can be necessary to further increase the mechanical stability of the thermoplastic material for certain requirements. For that purpose, it is possible by means of another embodiment of the present invention to incorporate rigid or flexible reinforcing materials, e.g. reinforcing fibers, e.g. glass fibers, carbon fibers, high-resistant organic fibers, metal fibers or ceramic fibers into the plastic materials, e.g. during the coextrusion of the thermoplastic material.

Due to the temperatures which are necessary for the coextrusion, the coextrudate having a more or less high temperature after leaving the extrusion dies. Now, it can be necessary to improve the bonding of the layers by pressing the laminate. However, it is necessary to still not cure through the powder paint at this time of the process. Optionally, it is necessary to bring the laminate to the desired temperature range by cooling it.

Subsequent to the coextrusion or the coating of the decorative layer or paint layer the moulding process of the obtained laminate takes place according to a preferred embodiment of the invention. For that purpose, a variety of known possibilities are available to the one skilled in the art. The moulding process can be omitted at all, e.g. during the preparation of sheet-like moulded parts.

However, in the case that a respective moulding process is desired, it is possible, subsequent to the coating of the decorative layer or the flat, uniform paint layer, e.g. by introducing the obtained laminate into a compression mould, to deep-draw this laminate to a desired form, according to a desired geometry, at an elevated temperature and, optionally, at reduced pressure. In this case, the temperatures and pressures to be used are known from the automotive engineering sector and, particularly from the production of moulded parts made of plastics. They are usually in the range of from 80 to 130° C. In this case, higher temperatures are leading to a curing of the powder paint.

The thus obtained moulded part can be released from the mould after cooling without any difficulty.

In a further embodiment of the invention, a clear paint layer is incorporated between the support film and the decorative layer or paint layer. In this case, the ability to draw off the support film from the clear paint layer which will become a component of the moulded part has to be ensured. Also this clear paint layer can be applied to the support film by means of the above mentioned processes for coating the decorative layer or paint layer. Per se known acrylate paints can be used which are particularly common in the automobile sector as a clear paint layer. The thickness of this layer is preferably from 10 to 50 $\mu$m. Also in this case, a bonding with the decorative layer or paint layer is preferred from the melt, at least at the boundary surface.

The layer thicknesses of the respective layers of the laminate made of thermoplastic material, powder paint, support film and, optionally, clear paint layer are less critical, i.e. in each case they are adapted to the special type of application. The layer thicknesses are particularly depending upon the extrudability and the desired properties of the respective layers. A moulded part which should have certain supporting properties, generally needs a greater layer thickness than a moulded part which is only serving for decorative purposes. In such a way, it is, e.g. possible to extrude the thermoplastic material to a layer thickness of from 0,2 to 10 cm, particularly 0,5 to 5 cm, or to produce it by the injection-behind-technique.

Although theoretically a thickness layer corresponding to the thermoplastic plastic layer should also be extrudable, it is however preferred to adjust the thickness layer of the powder paint coating in the range of from 0,1 to 5 mm, particularly 0,02 to 0,1 mm or 0,1 to 0,5 mm. In this case, the thickness of the powder paint coating is directly proportional to the costs of the coating. Correspondingly, the one skilled in the art will try to apply the powder paint coating as thin as possible, however, without accepting limitations in relation to the performance thereof. For instance, greater thickness layers can be necessary when using reinforcing materials between decorative layer or paint layer and extrudable plastic material.

By means of the present invention, preferably moulded parts made of thermoplastic materials can be prepared for the inside zone and outside zone of automobiles, for shop fittings and decoration for exhibitions.

In the automobile sector, it is particularly preferred to produce parts of the car body, mud guards, engine hoods, trunk lids, hubcaps, fenders, cape hood coverings, windscreens, interior claddings, rear mirror cases, motor coverings, ornaments and/or door coverings or parts thereof, by means of the present invention.

I claim:

1. Process for manufacturing decorable moulded parts comprising:

extruding a decorative layer or paint layer composed of a thermoplastic-duroplastic material which is non-dried or non-cured with a separable support film to form a laminate;

placing the laminate within a mould;

injecting or pressing an extrudable thermoplastic material behind the decorative or paint layer of the laminate in the mould such that the support film, the decorative or paint layer, and the thermoplastic material are sandwiched together by heat and pressure within the mould to form a moulded part and such that the decorative or paint layer and the thermoplastic material are brought together with both in a molten state and with sufficient heat to cure the decorative or paint layer and cause melting of the two materials at their engagement to form a blending between the decorative or paint layer and the extrudable thermoplastic material, wherein the decorative layer or paint layer is cured in a temperature range of from 130 to 240° C. during 0.5 to 120 minutes;

releasing the moulded part from the mould; and stripping the support film from the decorative or paint layer of the moulded part.

2. Process for manufacturing decorable moulded parts comprising:

extruding a decorative layer or paint layer composed of a thermoplastic-duroplastic material which is non-dried or non-cured between a separable support film and an extrudable thermoplastic material to form a laminate;

pressing the laminate within a mould such that the support film, the decorative or paint layer, and the thermoplastic material are sandwiched together by heat and pressure within the mould to form a moulded part and such that the decorative or paint layer and the thermoplastic material are brought together with both in a molten state and with sufficient heat to cure the decorative or paint layer and cause melting of the two materials at their engagement to form a blending between the decorative or paint layer and the extrudable thermoplastic material, wherein the decorative layer or paint layer is cured in a temperature range of from 130 to 240° C. during 0.5 to 120 minutes;

releasing the moulded part from the mould; and stripping the support film from the decorative or paint layer of the moulded part.

3. Process according to claim 2, wherein the support film has a thickness of from 30 to 200 μm.

4. Process according to claim 2, wherein the support film is a plastic film.

5. Process according to claim 2, wherein the thermoplastic material is selected from acrylonitrile-butadiene-styrene-polymerisates, polycarbonates and polyolefins, including polyethylene, polypropylene, polyvinyl compounds, polyamides, polyacetals, polyepoxides, polyurethanes, ionomers and mixtures thereof, including ABS/PC-polymerisates, which optionally contain filler materials.

6. Process according to claim 2, wherein the thermoplastic material contains reinforcing materials, selected from reinforcing fibers, including glass fibers, carbon fibers, high resistant organic fibers, metal fibers or ceramic fibers.

7. Process according to claim 2, wherein a clear paint layer is incorporated between the support film and the decorative layer or paint layer.

8. Process according to claim 7, wherein the clear paint layer has a thickness from 10 to 50 μm.

9. Process according to claim 7, wherein the support film is provided with a clear paint layer by spraying, dipping or roller printing.

10. Process according to claim 2, wherein moulded parts are produced for inside and outside zones of automobiles, for shop fittings and as decoration for exhibitions.

11. Process according to claim 1, wherein the support film has a thickness of from 30 to 200 μm.

12. Process according to claim 1, wherein the support film is a plastic film.

13. Process according to claim 1, wherein the thermoplastic material is selected from acrylonitrile-butadiene-styrene-polymerisates, polycarbonates and polyolefins, including polyethylene, polypropylene, polyvinyl compounds, polyamides, polyacetals, polyepoxides, polyurethanes, ionomers and mixtures thereof, including ABS/PC-polymerisates, which optionally can contain filler materials.

14. Process according to claim 1, wherein the thermoplastic material contains reinforcing materials, selected from reinforcing fibers, including glass fibers, carbon fibers, high-resistant organic fibers, metal fibers or ceramic fibers.

15. Process according to claim 1, wherein a clear paint layer is incorporated between the support film and the decorative layer or paint layer.

16. Process according to claim 15, wherein the clear paint layer has a thickness of from 10 to 50 μm.

17. Process according to claim 15, wherein the support film is provided with a clear paint layer by spraying, dipping or roller printing.

18. Process according to claim 1, wherein moulded parts are produced for inside and outside zones of automobiles, for shop fittings and as decoration for exhibitions.

* * * * *